United States Patent
Del Pico et al.

[11] 3,834,545
[45] Sept. 10, 1974

[54] SUPPORTED TUBULAR MEMBRANE

[75] Inventors: Joseph Del Pico, Brockton; Edward M. Shea, Saugus, both of Mass.

[73] Assignee: Abcor, Inc., Cambridge, Mass.

[22] Filed: Feb. 20, 1973

[21] Appl. No.: 333,804

[52] U.S. Cl. .............................. 210/321, 210/433
[51] Int. Cl. ............................................ B01d 31/00
[58] Field of Search ............ 210/23, 321, 433, 490, 210/491

[56] References Cited
UNITED STATES PATENTS

| | | | |
|---|---|---|---|
| 3,341,024 | 9/1967 | Lowe et al. | 210/490 |
| 3,480,147 | 11/1969 | Kahyok | 210/321 |
| 3,494,470 | 2/1970 | Banfield | 210/321 |
| 3,676,193 | 7/1972 | Cooper et al. | 210/23 X |

FOREIGN PATENTS OR APPLICATIONS 548,246   11/1957   Canada .............................. 210/321

*Primary Examiner*—Frank A. Spear, Jr.
*Attorney, Agent, or Firm*—Richard P. Crowley

[57] ABSTRACT

A tubular membrane is provided, the open end of the tubular membrane having a generally U-shaped elastomeric membrane boot, the inner wall of the boot extending over the semipermeable membrane on the interior of the support tube, the exterior wall of the boot containing two integral gasket ridges, and the membrane boot secured in position to the interior wall of the support tube. The tubular membrane is readily adapted to be installed in a sealing relationship within a singular shell, or within a multitube modular housing in a membrane system.

18 Claims, 6 Drawing Figures

SUPPORTED TUBULAR MEMBRANE

BACKGROUND OF THE INVENTION

Tubular membrances are typically employed in both high-pressure reverse osmosis and low-pressure ultrafiltration membrane processes and systems. Such tubular membranes comprise a porous tubular support adapted to provide support for a semipermeable membrane place on the interior or exterior of the support tube. Common support tubes are porous epoxy resin-reinforced, braided or filament wound glass-fiber support tubes (see U.S. Pat. Nos. 3,457,170; 3,547,272; and 3,563,889). The semipermeable membrane may be cast directly onto the interior or exterior surface of the support tube, or preformed in a generally tubular shape and then inserted into the interior of the tube. Most commercial tubular membranes presently in use comprise a rigid resin-reinforced porous glass-fiber support tube and a semipermeable membrane which has been cast onto the interior wall surface of the support tube, or a preformed tubular membrane which is inserted into the interior of the support tube and then expanded to its tubular form. The semipermeable membrane often employed comprises cellulose acetate. Such supported tubular membranes are employed in a variety of processes, such as, for example, in ultrafiltration processes at pressures of from 2 to 200 psig., in the concentration of proteinaceous components from a whey solution or the generation of a rinse permeate from an aqueous electrocoating paint solution.

The tubular membranes may be employed in experimental or pilot-plant models, but more typically, are employed in multitubular modular housings. In the manufacture of such supported tubular membranes, it is most desirable to provide a suitable gasketing arrangement at each end of the membrane tube so that the membrane may be easily fabricated and then installed in a particular shell or multitube modular housing. In addition, since the supported tubular membranes are subject to both low and high pressures, the particular gasketing system employed in which the end of the membrane is placed in a sealing relationship with a shell or housing should be such as to prevent leakage during initial start-up and continual operation of the tubular membrane in any process. Furthermore, the supported tubular membrane should be fabricated in such a manner so that the individual tubular-supported membranes may be easily exchanged or replaced during use.

SUMMARY OF THE INVENTION

Our invention concerns a tubular elastomeric seal and an improved supported tubular membrane containing such seal, and membrane devices containing such tubular membranes. In particular, our invention relates to a supported tubular membrane which contains at each end thereof means to permit the supported tubular membrane to be easily installed and placed in a sealing relationship within a membrane shell or a housing. Our improved supported tubular membrane containing my gasket seal as a membrane boot permits the rapid installation of the seals at each end of the membrane during tube manufacture. Our improved supported tubular membranes are readily installed in a single shell to form a seal between the interior wall of the shell and the exterior end of the tubular membrane. In addition our improved supported tubular membranes are easily installed and replaced in a multitube modular housing, our seals permitting the tubular membrane to form a seal between the exterior wall of the membrane and the interior wall of the modular housing.

Our improved tubular membrane comprises a rigid porous generally cylindrical membrane support tube; a semipermeable membrane positioned adjacent the exterior or interior wall of the support tube and extending substantially the length of the support tube; and a means to seal the ends of the support tube which includes a membrane boot comprising a generally tubular elastomeric boot adapted to be installed over the end of the membrane tube to form an exterior and interior seal.

The membrane boot is generally of uniform wall thickness; however, in our preferred embodiment, a first section thereof generally about one-half the boot has a slightly greater inside diameter than the second section. The difference between the diameter of the first and second sections of the boot is approximately twice the thickness of the tube 12. The portion of the boot having the greater diameter contains external integral half O-ring gaskets. One or more, typically, two, three or four generally parallel gasket ridges extend upwardly from one surface of the wall of the boot. It is the purpose of these half O-ring gaskets to achieve the process fluid to permeate fluid seal, accomplished by their comparison to a single tubular membrane shell or module header. The portion of the boot having the smaller diameter may also have similar, although somewhat smaller, integral half O-ring gaskets on the internal surface, the purpose of which is to form a gasket-to-membrane surface seal. The membrane boot is placed over the open end of the supported membrane tube, the small diameter portion of the boot fitted internally within the open end of the membrane tube, the inner wall of the boot extending over the end of the semipermeable membrane within the tube. The larger outside diameter first section of the boot is then folded over the open end of the tube and extends a short distance over the exterior surface of the supported membrane tube. The membrane boot, on installation, thus generally assumes a U-shape, with the boot extending continuously adjacent the interior wall of the support tube and over the semipermeable membrane, over the outer edge of the end of the support tube, and then adjacent the exterior wall of the support tube. Typically, the boot may extend equally distant both within the interior and the exterior of the support tube, and snugly fits the inner and outer wall of the support tube.

The membrane boot is typically molded or otherwise formed of a flexible elastomeric material, such as of Neoprene, Viton, ethylene-propylene rubber, copolymer or terpolymer and the like, although the boot may be comprised of any inert material which permits its installation and use. The boot has integrally formed onto at least one surface of the membrane boot one or more spacial gasket ridges, but typically, two to four parallel spaced apart gasket ridges. On installation, the gasket ridges extend outwardly on the exterior surface of the tubular support, whereby on installation, such ridges form an effective seal against the interior wall surface of a shell or housing element. In addition, where desired, gasket ridges may be used on the other surfaces of the boot to provide effective seals between the membrane and the boot.

Our improved supported tubular membranes containing the installed membrane boot also include a means to secure the boot in position and to the interior membrane surface 15 which is an integral portion of the support tube internal surface. The membrane boot may be secured in place through the use of adhesives or mechanical means, such as the installation of a split snap ring ferrule, or by forming the boot dimensions of a material such that the boot is retained in place in use; e.g., by the tension of the boot in place. The membrane boot may be secured both to the interior and exterior walls of the support tube; however, it is usually necessary to secure the boot at least to the interior wall so that on start-up, fluid will not pass between the boot and the semipermeable membrane and cause leaking. The use of a mechanical securing means, such as a ferrule, is preferred, since it permits ease in installation and replacement of the boot.

Our tubular membranes containing the membrane boot permit rapid manufacture and assembly of completed membrane tubes, while further, permitting the rapid installation and replacement of such tubes within a single tube house or a multitube modular housing.

DESCRIPTION OF THE EMBODIMENTS

Figure 1:
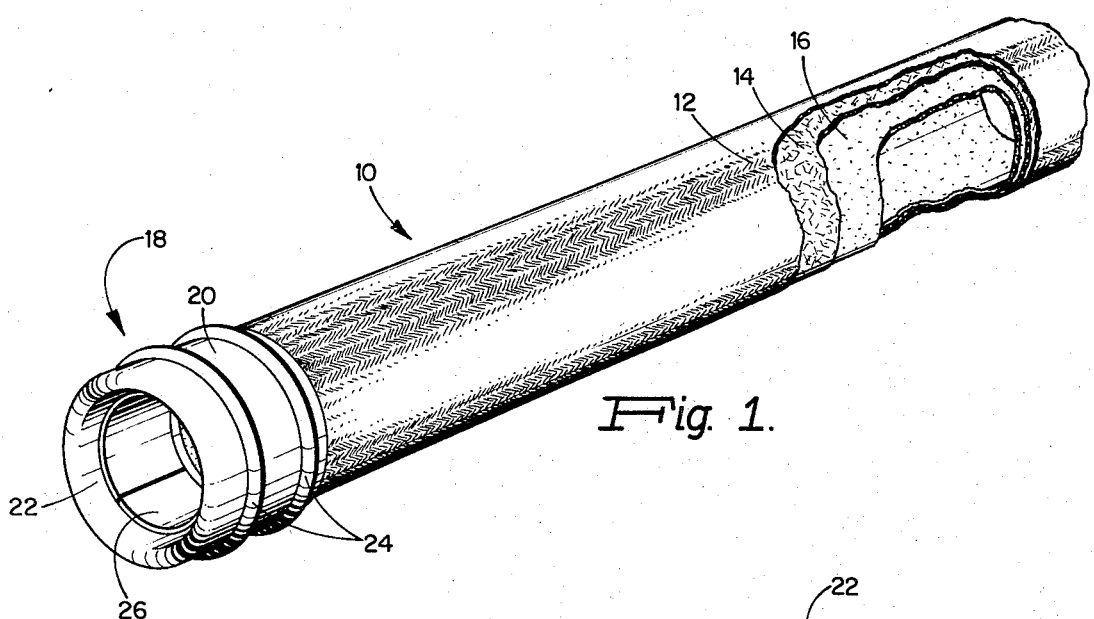
FIG. 1 is a perspective view of one end of a supported tubular membrane containing our membrane boot with a section of the tube.

FIG. 1 shows a perspective view of a tubular membrane of our invention 10, a rigid resin-reinforced porous braided support tube 12, a polyester Dacron felt inner lining within the support tube 14, and a cellulose acetate semipermeable cast membrane 16, the membrane 16 cast onto the lining 14 within the support tube 12 to form a semipermeable membrane of desired flux and selectivity characteristics. Snugly fitted to the interior and exterior wall surfaces of the support tube 12 is a membrane boot 18 having an outer section 20 and an inner section 22. The inner wall of the boot 18 extends over the membrane 16 and forms an inner seal with the membrane surface. The outer section 20 contains ridges 24 on the outer wall, the ridges integrally formed with the boot 18 and serving as gaskets, one ridge extending toward the end of the support tube 12 and the other at the other end of the boot 18. In the interior of the support tube 12 is a split metal snap ring ferrule 26 in an expanded condition, securing the boot 18 to the interior wall of the tube 12.

Figure 2:
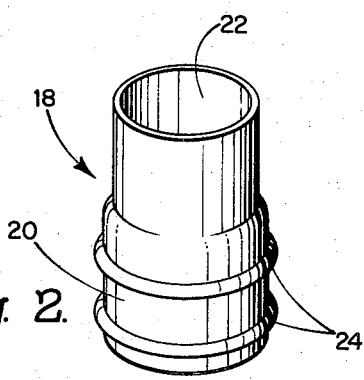
FIG. 2 is a perspective view of the membrane boot prior to installation.

FIG. 2 is a perspective view of the membrane boot 18, the boot being generally cylindrical in shape, and comprising an outer section 20 and an inner section 22, the outer section 20 being of slightly larger outside diameter than the inner section 22, although the boot may have the same uniform wall thickness throughout. For the purposes of illustration, the boot 18 is shown inside out; i.e., the exterior surface shown. The ridges 24, after installation, project outwardly from the outer wall of the boot and are exterior of the boot as shown. The boot 18 is shown having a smooth inner wall; however, if desired, additional gasket-type generally parallel ridges may be placed spaced apart along the length of the boot in order to insure a seal between the wall of the boot and the interior wall of the tubular membrane.

The boot is illustrated with two outer ridges 24. A single gasketing ridge may be employed; however, it is not preferred, since if the tubular membrane is installed within a shell or module at an angle, the possibility of leakage might occur. It is preferred that two or more parallel ridges 24 be employed, and generally spaced apart as illustrated in order to provide stability and so as to retain the tubular membrane in the desired position within a cylindrical passageway or outer shell. The boot material may be made of any material, so as to insure a compress-type snug fit between the surfaces of the boot and the inner and exterior walls of the tubular membrane.

The boot assembly 18 of FIG. 2 is installed into the open end of a supported tubular membrane by inserting inner section 22 of the boot interiorly of the open end of the membrane support 12 containing the lining 14 and the cellulose acetate membrane 16. The inner section of the boot 22 is of such a length as to extend inwardly; e.g., one-half to 1½ inches in length, and to be placed over the semipermeable membrane 16. The outer section 20 of the boot is then folded over the rough open edge of the open end of the support tube 12 and snugly fitted about the exterior wall surface of the tube support 12. The inner 22 and outer 20 sections of the boot extend generally equidistant on the interior and exterior wall surfaces of the support tube 12. Although a boot 18 is shown of two sections for ease of installation over the end of the support tube 12, a boot which is essentially uniformly tubular may be employed where the nature; i.e., elastomeric flexibility, of the materials permits. In the manufacture of the supported tubular membranes, the tubular membranes may be made in any length, cut to the desired length, and the boot assembly easily and rapidly installed.

The boot assembly 18 is held in position to the interior wall of the tubular membrane through the employment of a cylindrical snap ring metal ferrule 26. After installation of the boot 18, the ferrule 26 is inserted into the interior of the tube 12 in a reduced diameter condition; i.e., semicoiled condition, and then expanded with a tool until the split ends of the ferrule snap together as the ferrule forms a circle. The ferrule in its expanded condition forces the inner section of the boot wall against the interior wall of the membrane 16 in a fluid-sealing relationship. If desired, other means of securing at least the interior wall of the inner section 22 of the boot to the interior wall of the support tube may be employed, such as the use of adhesives or other fastening and securing means. In addition and where desired, the interior wall of the outer section 20 of the boot may be secured to the exterior wall of the support tube 12 through the use of adhesives or other securing means. It is desirable to secure at least the inner section of the boot to the interior wall of the support tube, since on a start-up of the membrane, if the boot is not so secured or is not so designed to press firmly against the interior wall of the support tube, leakage might occur on start-up or in use as the liquid in the tube lifts up the edge of the boot within the interior of the support tube, particularly during high-pressure reverse osmosis processes.

Figure 3:
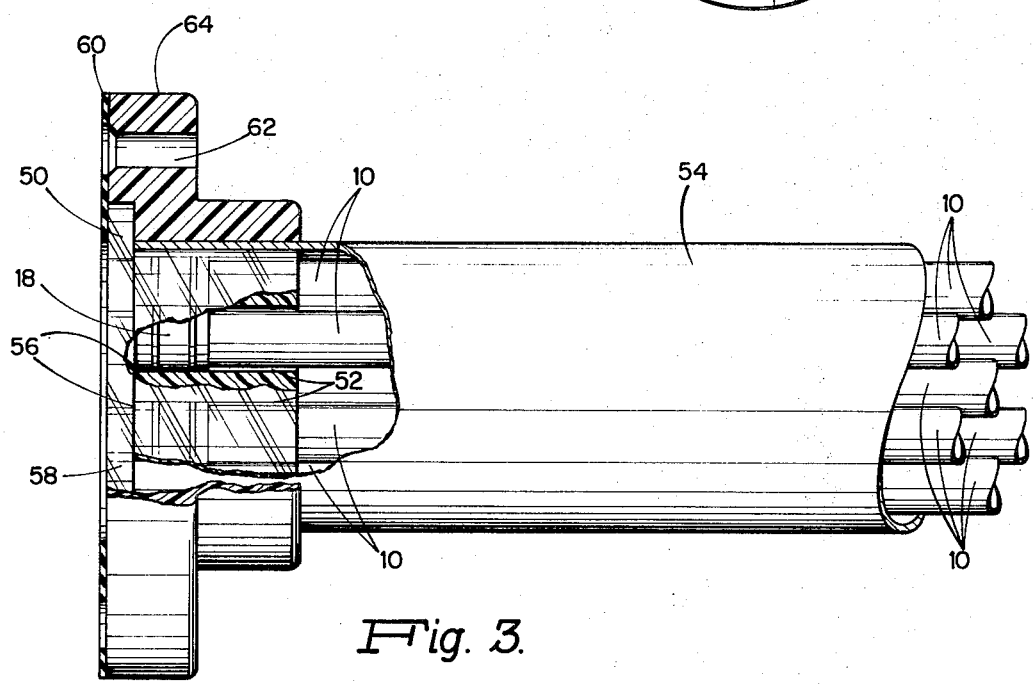
FIG. 3 is a side view partially cut away and cross-sectional of a multitubular membrane module.
Figure 5:
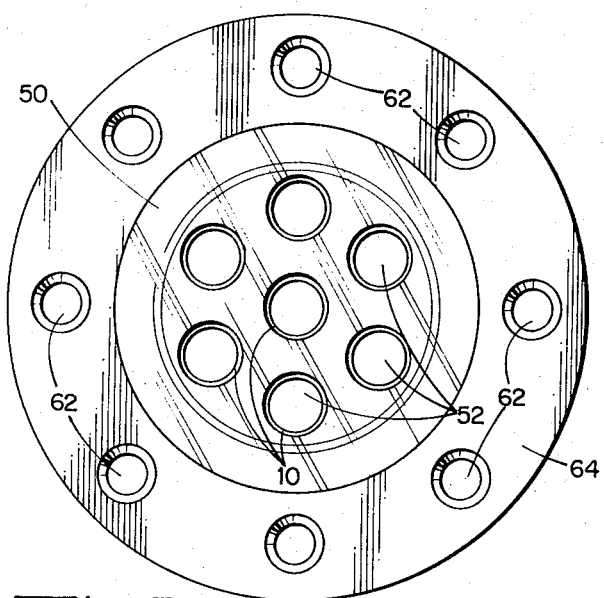
FIG. 5 is an end view of the module of FIG. 4.
Figure 4:
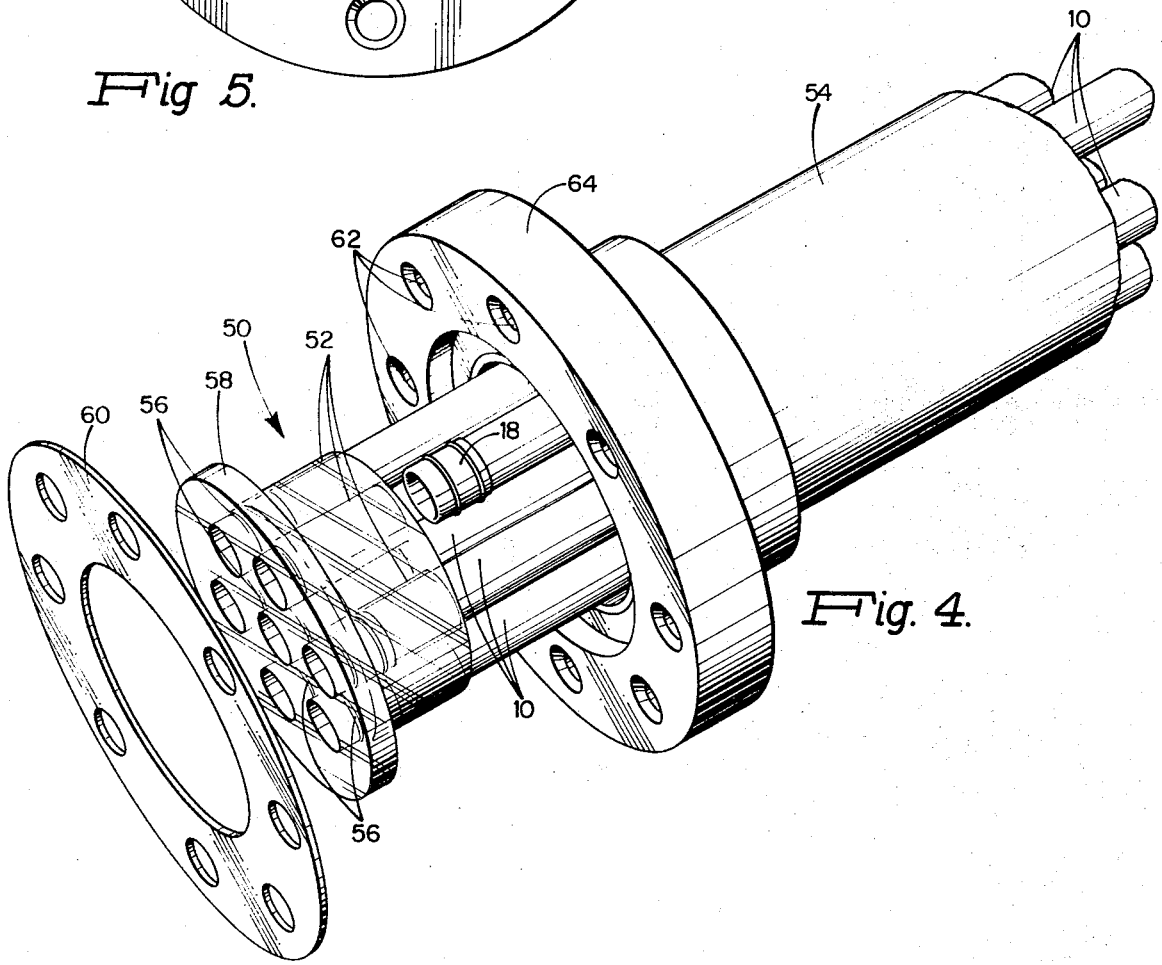
FIG. 4 is an exploded generally perspective view of a multitubular membrane module.

FIGS. 3, 4 and 5 show a multimembrane module housing 50 composed of a clear rigid plastic material having a series of spaced tubular passageways 52 in the housing 50. The outer diameter of the housing is adapted to fit snugly into the end of a rigid outer permeate collection shell 54 composed of thin walled stainless steel, carbon steel or a rigid plastic material, such as polyvinyl chloride (PVC), the shell 54 secured by adhesive to a rigid plastic end flange 64, with shoulders 56 in each of the tubular passageways 52 of the housing 50, whereby on insertion of the tubular membrane 10 into the passageways 52, the outer edge of the tube 12 and the elastomeric boot 18 will fit snugly against said shoulders in a fluid-sealing engagement. A flange gasket 60 is provided so that the end flange may be secured to a U-bend connector (not shown) through bolts passed through holes 62. In this arrangement, a number of tubular membranes are supported within the shell 54 and the permeate from the multiple supported membrane tubes 10 collected and removed from a permeate outlet in the shell (not shown), and the feed liquid forwarded to the connector to the next succeeding tubular module.

FIG. 4 shows one tubular membrane with the boot 18 removed from the insertion within the passageways 52 in the housing 50.

As is known, the tubular membranes are arranged in a serial connection of parallel tubes. The gasket ridges 24 form a fluid-sealing relationship with the interior wall surface of the passageways 52. The tubular membrane 10 may be easily inserted within the passageways 52, and removed when replacement is desired. The membrane boot 18 forms a seal between the outer section of the boot 20 and the interior wall of the shell 54 in which the permeate is collected. The tubular membrane may be removed merely by exerting a twisting axial force on the tubular membrane 10, and a new tube inserted in its place in a similar manner.

In operation, a feed liquid is introduced into one end of the interior of each of the tubular membranes. Liquid permeate which has passed through the semipermeable membrane 16 of the tubes collects in the shell 54 and is removed through the permeate outlet, while the concentrated feed stream is removed from the open other end of the tubular membranes and passed into the ends of the next serial-connected tubular membranes and the sequence repeated until the desired concentration or separation process is achieved. Our supported tubular membrane has been illustrated in use as forming an effective seal within a multitubular housing, but my membrane tubes may be employed singularly within a surrounding shell, for example, where the exterior surface of the tube is spaced apart only slightly from the interior surface of the shell to form a thin tubular permeate zone. Where my membrane tubes are so employed, the growth of microorganisms on the exterior permeate side of the tube is prevented in use, since the permeate zone is maintained with permeate; thus, preventing the growth of aerobic organisms which affect membrane flux; i.e., anaerobic conditions are maintained. In addition, the permeate may now be piped directly from the shell to the usage location (forced permeate flow), preventing the collection of permeate in a drip pan and the required use of a transfer pump to place it in the location of usage.

Figure 6:
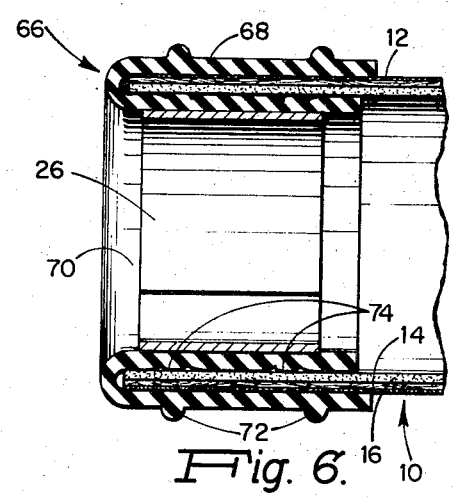
FIG. 6 is a fragmentary cross-sectional view of a modification of our membrane boot over the end of a tubular membrane.

FIG. 6 is a cross-sectional fragmentary view of a tubular membrane having a modified boot on the tubular membrane. In this embodiment, the modified boot 66 has an outer section 68, an inner section 70, outer ridges 72 and inner ridges 74 in a sealing, compressed condition on the interior wall of the boot 66 which is in contact with the inner and exterior walls of the support tube 12. In this arrangement, the ferrule 26 is generally placed between the ridges 74. The addition of additional gasket-sealing ridges is to provide a greater sealing action, particularly where the tubular membrane is operated under high pressures of, say, 500 to 2,000 psig.. The ridges are all molded integrally with the one-piece modified boot and the boot is installed in a similar manner as before.

We claim:

1. A tubular membrane which comprises in combination:
    a. a rigid porous membrane support tube;
    b. a semipermeable membrane positioned adjacent one wall of the support tube, and extending substantially the length of the support tube and to each end thereof;
    c. a means to place each end of the support tube in a radially fluid-sealing force relationship with a surface exterior of and surrounding the ends of the support tube which includes a membrane boot snugly fitted to the interior and exterior wall surfaces of the support tube at each end thereof in a generally U-shape, and which comprises a first and second section, the first section adjacent the interior wall of the support tube having a diameter slightly less than the second section which is adjacent the exterior wall of the support tube, the boot continually extending a short distance adjacent the interior wall of the support tube and over the semipermeable membrane, over the edge of the end of the support tube, and a short distance adjacent the exterior wall of the support tube, the boot having at least one gasket ridge projecting outwardly from the exterior surface of the boot, the gasket ridge adapted to be employed in a sealing engagement with the interior wall of the exterior surface; and
    d. means to secure the boot to the support tube.

2. The tubular membrane of claim 1 wherein the support tube comprises a braided resin-reinforced glass-fiber support tube with an integral highly porous felt inner surface.

3. The tubular membrane of claim 1 wherein the semipermeable membrane comprises a cast semipermeable membrane adjacent the interior wall of the support tube.

4. The tubular membrane of claim 1 wherein the semipermeable membrane comprises a preformed integral tubular semipermeable membrane positioned adjacent the interior wall of the support tube.

5. The tubular membrane of claim 1 wherein the semipermeable membrane comprises cellulose acetate.

6. The tubular membrane of claim 1 wherein the support tube comprises a porous sintered polymeric resin support tube.

7. The tubular membrane of claim 1 wherein the means to secure comprises an adhesive material.

8. The tubular membrane of claim 1 wherein the means to secure comprises an expanded ferrule adjacent to and expanded against the exterior wall of the membrane boot within the interior of the support tube.

9. The tubular membrane of claim 1 which includes at least two generally parallel spaced apart gasket ridges, one positioned toward the outer edge of the membrane tube, and the other positioned toward the outer exterior end of the boot.

10. The tubular membrane of claim 1 wherein the membrane boot comprises a one-piece elastomeric material, the gasket-ridge integrally formed with the boot.

11. The tubular membrane of claim 1 wherein the membrane boot comprises an elastomeric material and the difference in diameter between the first and second sections is approximately twice the difference in the wall thickness of the support tube.

12. A supported tubular membrane which comprises in combination:
a. a rigid porous cylindrical support tube composed of resin-reinforced hardened fiber glass and a highly porous inner surface on which the membrane may be cast directly;
b. a cellulose acetate semipermeable membrane positioned adjacent the interior wall of the support tube and extending substantially the length of the tube;
c. a means to place each end of the support tube in a radially fluid-sealing force relationship with the interior wall surface of a housing element surrounding the ends of the support tube, which means comprises a membrane boot composed of an elastomeric material and generally tubular in shape, approximately one-half of said boot composed of a first section having an outside diameter approximating the inside diameter of the support tube, and a second section having an outside diameter slightly greater than the first section by approximately the wall thickness of the support tube, the membrane boot snugly fitted in a generally U-shaped form onto each end of the support tube, the boot continuously extending in the first section adjacent the interior wall of the support tube and over the semipermeable membrane, and in the second section, over the exterior wall of the support, the exterior surface of the membrane boot on the exterior wall having at least two parallel-spaced gasket ridges projecting outwardly from such surface, one near the open end of the support tube, and the other positioned near the opposite end of the membrane boot, the membrane boot and gasket ridges so positioned adapted to be placed in a fluid-sealing engagement with the interior wall of a housing; and
d. means to secure the membrane boot in position onto the interior wall of the support tube.

13. A membrane device which comprises:
a. a rigid outer tubular shell element adapted to surround a plurality of supported tubular membranes;
b. a housing element sealed to and at each end of the shell element, each of the housing elements characterized by a plurality of cylindrical passageways aligned substantially parallel with the shell element, the passageways inwardly of the shell slightly larger in diameter than the passageways extending to the outer face of the housing element, to form a shoulder within the housing element;
c. a plurality of supported tubular membranes of claim 1, each end of which is positioned within a housing, the tubular membranes extending the length of the shell element, the gasket ridge of the membrane boot at each end forming a fluid-tight seal with the interior wall of the passageways and the edge of the membrane boot adjacent to and against the shoulders;
d. means to remove permeate from the interior of the shell element; and
e. means to remove a membrane concentrated liquid stream from the interior of the supported tubular membranes of the housing at one end, and to introduce a liquid feed stream into the interior of the tubular membranes in the housing at the other end.

14. A membrane device which comprises:
a. a tubular rigid outer shell element;
b. a supported tubular membrane of claim 1 extending the length of the shell element, the exterior surface of the tubular membrane spaced close to the interior surface of the shell element to form a permeate zone;
c. a housing element secured to each end of the shell element, the gasket ridges of the tubular membrane at each end in a fluid-sealing relationship and engagement with the interior wall surface of each housing element;
d. means to remove permeate from the permeate zone; and
e. means to introduce into the interior of the tubular membrane at one end and to remove membrane concentrated materials from the other end of the tubular membrane within the shell.

15. A membrane boot adapted to be inserted into one end of a rigid tubular membrane and to form a snugly fitted U-shaped end fitting, which membrane boot comprises a generally tubular element of uniform wall thickness and composed of an elastomeric material, about one-half of the element having a first inner diameter approximately the same or slightly larger than the inner diameter of the open end of the membrane tube, the remaining portion of the element having a second inner diameter greater than the first inner diameter by distance of about or slightly less than twice the wall thickness of the rigid tubular membrane, the surface of the boot to be placed on the exterior of the tubular membrane containing at least one circumferential sealing ridge thereon and integrally formed with the boot.

16. The boot of claim 15 wherein one surface of the boot contains at least two spaced apart generally parallel circumferential ridges, each positioned toward each end of the larger diameter portion of the boot.

17. The boot of claim 15 wherein the surface of the boot which is placed against the interior wall of the tubular membrane contains at least one circumferential sealing ridge thereon and is integrally formed with the boot.

18. The tubular membrane of claim 1 wherein the means to secure the boot comprises a cylindrical, metal, split-end, snap ring ferrule, the ferrule in its expanded condition, thereby forcing the inner wall of the boot against the interior wall of the membrane in a fluid-tight manner.

* * * * *